Aug. 14, 1956  S. HOPKINS  2,758,578
INTERNAL COMBUSTION ENGINES
Filed Oct. 27, 1952  3 Sheets-Sheet 1

INVENTOR.
STEPHEN HOPKINS
BY
*J. H. Grahame*
ATTORNEY

Aug. 14, 1956  S. HOPKINS  2,758,578
INTERNAL COMBUSTION ENGINES
Filed Oct. 27, 1952  3 Sheets-Sheet 2

INVENTOR.
STEPHEN HOPKINS
BY J. H. Grahame
ATTORNEY

Aug. 14, 1956  S. HOPKINS  2,758,578
INTERNAL COMBUSTION ENGINES
Filed Oct. 27, 1952  3 Sheets-Sheet 3

INVENTOR.
STEPHEN HOPKINS
BY
J. H. Grahame
ATTORNEY

United States Patent Office 2,758,578
Patented Aug. 14, 1956

2,758,578

INTERNAL COMBUSTION ENGINES

Stephen Hopkins, Fishkill, N. Y., assignor to The Texas Company, New York, N. Y., a corporation of Delaware Application October 27, 1952, Serial No. 317,048

4 Claims. (Cl. 123—32)

This invention relates to internal combustion engines and methods of operating them. More particularly, the invention is concerned with internal combustion engines of the general type disclosed in U. S. Patent No. 2,484,009, granted to E. M. Barber on October 11, 1949.

In engine operations to which the instant invention applies, the oxidizing gas (say air) for the combustion is caused to form a compressed rapidly swirling mass in the engine cylinder. The fuel (say natural gas, gasoline, kerosene, diesel fuel, or even a heavier hydrocarbon mixture) is injected into the compressed swirling mass of oxidizing gas during each cycle so as to impregnate a localized segment of the swirling mass and thus form a combustible "patch." The first increment of the patch is ignited (by a spark, compression, or other means) substantially as soon as it is formed, the ignition taking place near the locus of fuel injection.

In this way a flame is formed at the front of the patch. This flame front tends to travel in the opposite direction to the swirl toward the locus of fuel injection. The resulting combustion products rotate in the direction of the swirl away from the flame front, and the flame front is fed with fresh combustible mixture swirling toward it and formed of successive increments of fuel injected into successive increments of the swirling oxidizing gas. Successive increments of combustible mixture are thus fed to the flame front and burned substantially as fast as they are formed during each combustion period of the engine, the injection of fuel ceasing as soon as sufficient fuel for that power stroke has been injected.

The combustible "patch" is confined on one side by an incombustible layer of the combustion products and on its other side by an incombustible layer of oxidizing gas containing little or no vaporized fuel, so that it is incombustible. Combustion is thus confined to and completed in the patch. Under optimum operating conditions substantially no "end gases" are formed, and in any case, "end gases" if they are formed are not exposed to the pressure and temperature for the time required to bring about spontaneous ignition. In consequence, knock is inhibited even at high compression ratios, much above those that may be tolerated even with fuels of high anti-knock value in conventional Otto-cycle engines.

The aforesaid Patent No. 2,484,009 discloses engines which employ the improved combustion process described above in four-cycle operation. In a preferred embodiment, the air swirl in these engines is produced by providing a shroud on an intake valve.

Co-pending application Serial No. 284,075, filed on April 24, 1952, and now issued as Patent No. 2,691,968, discloses engines employing the improved combustion process in two-cycle operation. The air swirl in these engines is produced by providing intake ports in the wall of the cylinder. The ports are disposed so that the downstream wall of each port is disposed tangentially to a circle having a diameter which is of the order of 95 to 99% of the diameter of the cylinder.

Both of these arrangements serve to introduce air into the cylinder so that the movement of the swirling air mass approximates solid body rotation. However, I have discovered that the performance of such engines can be improved markedly by employing my improved air intake means which provides more effective control over the air swirl in the cylinder.

In accordance with my invention, ports somewhat similar to those disclosed in the above cited application Serial No. 284,075 are employed. However, the ports are arranged so as to provide air swirl which more closely approaches the condition of solid body rotation. Thus, the portions of the swirling air mass located at one radial distance from the axis of the cylinder have substantially the same angular velocity as that of the portions of the air mass located at a different radial distance.

The invention is useful in both two-cycle and four-cycle engines and gives improved utilization of oxidant (say air), i. e. it gives more power per unit mass of oxidant. In two-cycle engines it has a further advantage, in that it tends to improve scavenging efficiency.

These and other aspects of the invention are explained with reference to the accompanying drawings, in which.

Figure 1:
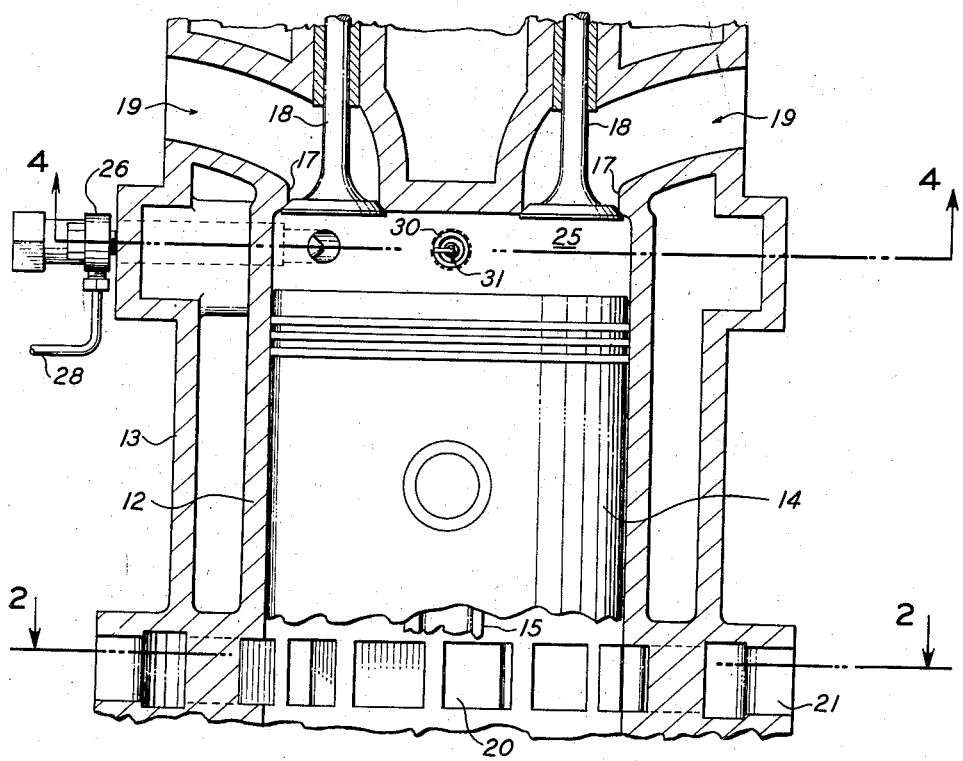
Fig. 1 is a partial vertical sectional view taken along line 1—1 of Fig. 4 of a two-cycle engine employing the air intake arrangement of the present invention.
Figure 4:
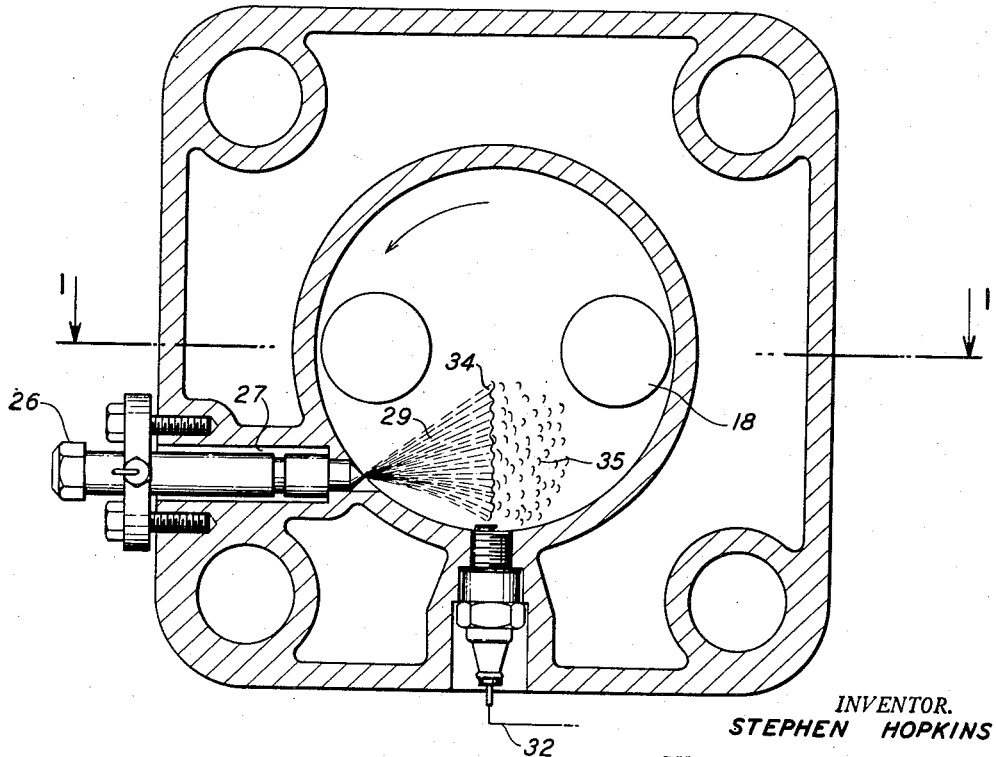
Fig. 4 is a horizontal sectional view along line 4—4 of Fig. 1.

Referring to Figs. 1 and 4, the engine comprises a cylinder 12 having a cooling jacket 13, a piston 14 and a connecting rod 15 which runs to the usual crankshaft (not shown). The cylinder is equipped with two exhaust ports 17 controlled by a pair of poppet valves 18, operated from the engine crankshaft through a cam shaft and tappet drive in conventional manner. The exhaust ports 17 open into exhaust passages 19 leading to a common exhaust manifold. The cylinder 12 is provided with a circumferential series of air intake ports 20 extending through the wall thereof, and communicating with an intake manifold 21. The ports 20 are located adjacent the opposite end of the cylinder from the exhaust ports 17 and somewhat above the bottom dead center position of the piston. Reciprocation of the piston thus controls the opening and closing of the air intake ports, while a cam and tappet drive controls the exhaust ports, thereby rendering the timing of the exhaust and intake ports independent of each other, but synchronized with engine operation.

The air drawn through the ports 20 swirls around the cylinder at a substantially fixed rate with respect to the speed of the engine in R. P. M., regardless of changes in engine speed. Swirl rates of from four to nine times the engine speed in R. P. M. are satisfactory. A swirl rate of six or seven times the engine speed during the combustion period is preferred.

A fuel injection nozzle 26 extends through a suitable opening 27 in the cylinder head, and is directed to discharge a cone-shaped spray into one side of a diameter of the disc-shaped combustion space 25 in the direction of air swirl, so as to uniformly impregnate a localized segment of the swirling air mass across a radius of the combustion space at a fuel-air weight ratio of about 0.05 to 0.09. It will be understood that fuel is supplied by a suitable fuel pump driven by the engine in conventional manner to the injection piping 28 at controlled periods in the engine cycle.

The fuel injection is initiated well in advance of top dead center, say 50 to 20 crank angle degrees. At high power, the fuel is injected into the air stream during about 80 to 90% of the time required for the air to complete one swirl around the cylinder. For reduced load conditions, the amount of fuel may be reduced by maintaining the rate of injection approximately the same and reducing the relative duration of the injection period.

The fuel may be ignited in various ways. For example spark ignition, glow-plug ignition, or compression ignition may be employed. In this embodiment of the invention a typical spark ignition arrangement is shown. A spark plug 30 is mounted in the cylinder wall with the electrodes 31 of the plug positioned close to the periphery of the combustion space 25. The spark plug is connected by a lead 32 to a conventional ignition circuit, which is actuated in synchronism with the engine to produce a spark at the electrodes 31 at the time when the first increment of injected fuel from nozzle 26 has formed combustible fuel vapor-air mixture, and is susceptible to ignition. The location of the plug 30 is correlated with the location of the nozzle 26 and the velocity of air swirl so as to be within the region of the impregnated localized segment where combustible fuel vapor-air mixture is first formed. Very satisfactory operation is secured with the arrangement shown where the electrodes 31 are located more than 20° and less than 75°, preferably about 30-45°, of radial angle from the locus of fuel injection. The nozzle 26 is preferably directed to discharge in a fan or cone-shaped spray, the outer edge of which closely approaches the electrodes 31. Since the outer edge of the spray is generally more diffuse, the swirling air picks up this portion of the fuel with rapid vaporization thereof to form the combustible mixture that contacts electrodes 31 substantially as soon as formed. In the arrangement shown, the provision of a spark at electrodes 31 about 4–10 crank angle degrees after the initiation of injection, insures ignition with the flame then spreading rapidly across the localized impregnated segment to produce the flame front indicated at 34 extending generally across a radius of the combustion space.

It will be understood that the combustion in this case is that of a combustible mixture consumed at a single flame front and is distinct from the heterogeneous burning at a plurality of dispersed fuel-droplets of diesel combustion. However, instead of the combustion space 25 being filled, or substantially filled, with preformed combustible mixture at the time of ignition with the resulting flame front traveling outwardly from the point of ignition in a generally spherical path through the combustible mixture, as in conventional Otto-cycle engines, there is only the small localized segment opposite the plug 30 at the time of ignition. The flame front thus spreads across this combustible segment and travels counter to the direction of air swirl through succeeding portions of combustible mixture formed immediately in advance of the flame front as injection continues. The first formed products of combustion indicated at 35 rotate with the swirling mass away from the flame front 34 as freshly impregnated compressed air rotates toward the flame front. The established flame front 34 tends to travel toward the nozzle 26, but this movement is impeded by the swirling movement of the air and by the fact that the localized impregnated segment closer to the nozzle is incombustibly rich. The net result is that flame front 34 remains comparatively fixed with respect to the cylinder wall, fuel nozzle and ignition plug, although it is traveling through a thin layer of combustible mixture formed immediately in advance of the flame front.

I have discovered that the operation of the engine is markedly improved if the ports 20 are arranged to cause each portion of the air mass to swirl around the cylinder at substantially the same angular velocity. This prevents shearing of the flame front during the combustion period and also improves the scavenging efficiency in two-cycle engines.

Figure 2:
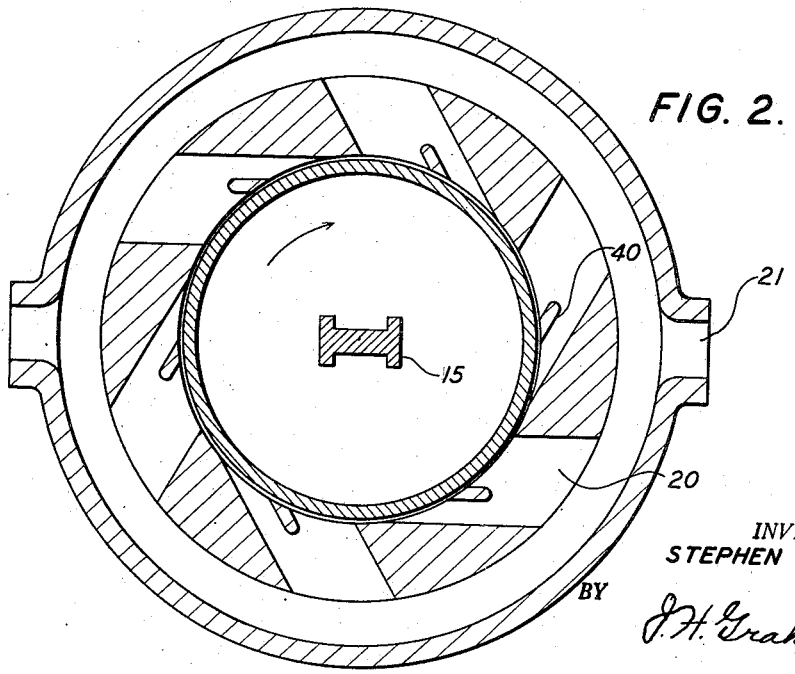
Fig. 2 is a horizontal sectional view taken along line 2—2 of Fig. 1 showing one embodiment of the air intake ports of my invention.
Figure 3:
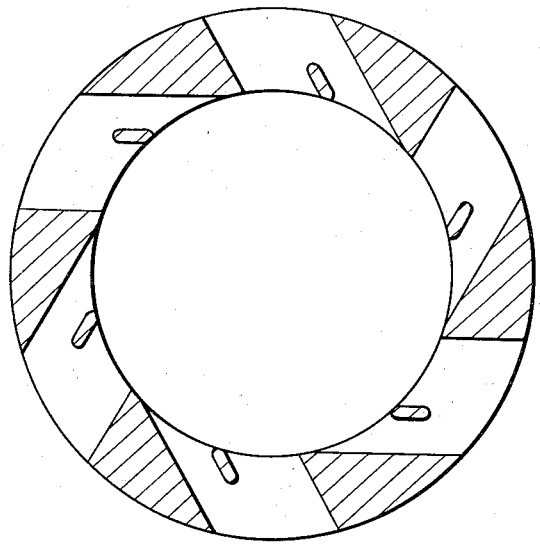
Fig. 3 is a horizontal sectional view showing an alternative embodiment of the air intake ports.

Figs. 2 and 3 show two arrangements for the air intake ports which provide such air swirl.

In each arrangement six ports of rectangular cross-section are employed. The opposed walls of the individual ports are parallel and the adjacent walls of adjacent ports are disposed at approximately a 60° angle with respect to one another and with the chosen flow axes of the individual ports indicated in the drawings as normal to the cylinder axis. Preferably the height of the ports is about three-fourths the width of the individual ports.

Each port has a vane 40, which extends from the inner wall of the cylinder and parallel with respect to the side walls of the port. The length of the vanes is about one-third the length of the ports and do not extend upstream beyond the perpendicular between the side walls of the associated port erected at the intersection of the upstream side wall and the inner wall of the cylinder; and the spacing between the vanes and the walls of the port is such that the arcs of the ports where they enter the cylinder are approximately bisected by the center lines of the vanes.

The vanes serve to increase the strength of the cylinder wall about the air intake and to guide and retain the piston rings. Apparently the vanes also provide a directive action toward the axis of the cylinder which causes the air which is admitted through the ports to more effectively scavenge the core of combustion products from the cylinder. The main reason for employing vanes in the ports is to permit the use of a small number of wide ports. I have found that six ports is the optimum number.

In the arrangement shown in Fig. 2, the downstream side wall of the port is disposed tangentially with respect to the inner wall of the cylinder.

In the arrangement shown in Fig. 3, the downstream side wall of the port is disposed tangentially with respect to a circle having a diameter of the order of 95% of the diameter of the cylinder.

In the former arrangement with a minimum of bridge structure left between the six ports found required for the desired air swirl rate, the width of the ports is equal to one half the radius of the cylinder. When the latter arrangement is used and more bridge structure between the ports is left, the width of the ports is less than one half the cylinder radius.

The trailing edges of the vanes shown in Fig. 3 are slightly rounded and terminate in a surface approaching a radius of the cylinder so as to eliminate a feather edge on the respective vanes. This eliminates feathering of the air which is admitted through the ports and it also serves to direct some of the air toward the axis of the cylinder.

The trailing edges of the vanes shown in Fig. 3 may be shaped like those shown in Fig. 2 if desired. Likewise, the trailing edges of the vanes shown in Fig. 2 may be rounded like those shown in Fig. 3 if desired.

In the preferred operation of the engine of Fig. 1, starting with the piston moving downwardly on a power stroke, exhaust valves 18 are opened about 70° before bottom center. Products of combustion start rushing out through the exhaust passages 19 to the exhaust manifold, thereby lowering the pressure substantially to that in the air intake manifold 21. About 50° before bottom center, the air intake ports 20 start to open, and these remain open until after the closing of the exhaust ports 17 about 45° after bottom center. During this prolonged period of the cycle, the rising column of swirling air pushes the remaining products of combustion ahead of it through the ports 17 to the exhaust passages. The intake ports 20 are then closed by the piston about 50° after bottom dead center, and the swirling mass of air remaining in the cylinder is then compressed into the combustion space 25 about the time of initiation of fuel injection on the compression stroke, which is substantially the position of the parts shown in Fig. 1. For full load maximum power operation, initiation of injection may begin about 50° before top center, with combustion starting almost immediately and with a duration of injection of about 55–60°, depending upon the velocity of air swirl, to substantially completely impregnate all the swirling air within the cylinder on one revolution thereof. The piston is thus driven on a new power stroke and the cycle repeated.

Figure 5:
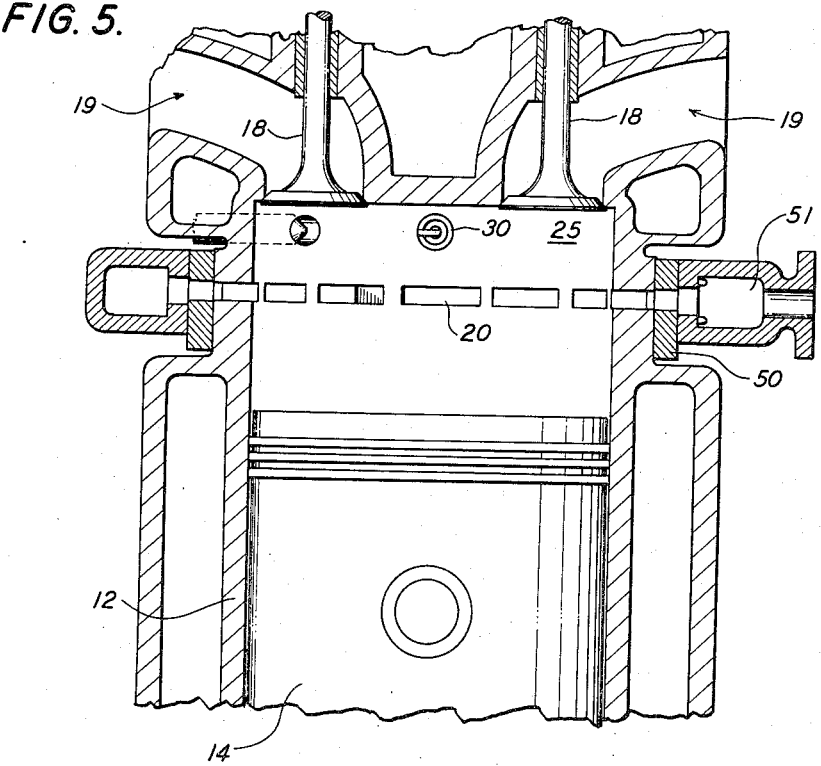
Fig. 5 is a partial vertical sectional view of a four-cycle engine employing the air intake arrangement of the present invention.

Fig. 5 shows a four-cycle engine employing air intake ports of the type shown in Figs. 2 and 3.

In this embodiment of the invention the ports 20 are located adjacent the top of the cylinder. The ports are shaped the same as those shown in Figs. 2 and 3; however, the height of the ports is less than that of the ports employed in two-cycle engines because air is introduced to the cylinder over longer periods of time in four-cycle operation.

A rotatable sleeve valve 50 serves to open and close the inlet ports. The movement of the valve 50 is coupled to the crankshaft by a suitable mechanism (not shown) for actuating the valve in synchronism with the operation of the motor. Air intake manifold 51 serves to provide the air which is introduced to the cylinder through openings in the valve 50 which correspond to the port openings in the cylinder wall.

As indicated at the outset, the practice of the invention tends to improve utilization of the oxidizing gas in both two and four-cycle engines so that, other conditions remaining the same, there is an increase in power generated per unit weight of oxidant introduced. In one instance, the practice of the invention in a two-cycle engine brought about an increase of horsepower developed per pound of air which exceeds 20%. It is difficult to assign reasons for this improvement, but it is believed to be due, at least in part, to the prevention of "shearing" of the flame front which tends to occur when the swirling mass at one radius has a markedly different angular velocity than that of the mass at another radius in the combustion chamber. It is also probable that the practice of the invention brings about better combustible mixture formation. Whatever be the explanation, the fact remains that in engines of the type under consideration, the invention permits marked increase in power developed per unit mass of air or other gaseous oxidant employed.

In two-cycle engines, the present invention affords a further advantage, for it brings about a marked improvement in scavenging efficiency. For efficient operation of an engine of the type here considered, the swirl rate should be very high, and in some instances may be more than six or eight times greater than the rate of revolution of the engine. So the swirl rate, even at normal engine speeds, is so high that there is a tendency for hot gaseous combustion products to concentrate at the center of the cylinder with the colder gas swirling around this hot core. This effect interferes with scavenging in two-cycle engines, for the cold air blown through the cylinder during scavenging tends to by-pass from inlet to exhaust ports and leave a hot core of combustion products in the cylinder. Scavenging is further hampered in two-cycle engines if vortexing occurs, for this tends to leave a stagnant "sleeve" adjacent the cylinder wall in which combustion products are held instead of being exhausted. By causing the swirl to approximate solid body rotation, i. e. with uniform angular velocity of swirl across the cylinder, scavenging is improved markedly by reducing by-passing in the cylinder during the scavenging phase.

I claim:

1. An intake structure, for causing an oxidizing gas introduced into the cylinder of an internal combustion engine to swirl around the axis of said cylinder so that all portions of said gas move at substantially the same angular velocity throughout the cross section of said cylinder, comprising a cylinder having a plurality of ports located circumferentially and uniformly in the wall thereof, the opposed walls of the individual ports being substantially parallel to each other and with the adjacent walls of adjacent ports being disposed at approximately 60° with respect to one another, the width of each port being of the order of ½ the radius of said cylinder, the downstream side wall of each port being disposed substantially tangentially with respect to the inner surface of the wall of said cylinder, each port having a vane located therein disposed substantially parallel to the side walls and extending from the top to the bottom wall thereof and beginning at said inner surface of the wall of said cylinder, dividing the port into separate channels having substantially equal arcs where they enter said cylinder.

2. In an intake structure as set forth in claim 1, said downstream side wall of each port being disposed tangentially with respect to a circle having a diameter of the order of 95% of the cylinder diameter, the vane in each port being approximately ⅓ of the length of the associated port and extending upstream thereof no further than the perpendicular between the side walls of the port erected at the point of intersection between the upstream side wall and the inner periphery of the cylinder.

3. In a reciprocating piston internal combustion engine wherein oxidizing gas is introduced into a cylinder of said engine so that said gas swirls rapidly around the axis of said cylinder and fuel is injected into a localized segment of the swirling gas disposed at one side of a diameter of said cylinder and ignited to provide a flame front which is confined in one direction by said oxidizing gas traveling toward said flame front and containing so little vaporized fuel that it is incombustible and in the opposite direction by products of combustion traveling away from said flame front, the improvement which comprises providing said cylinder with a plurality of ports circumferentially and uniformly located in the wall of said cylinder and having the same sense of direction of rotation, the opposite walls of individual ports being parallel to each other and the contiguous walls of adjacent ports being disposed at a 60° angle with respect to one another, the width of each individual port being approximately one half the radius of said cylinder and the height of each individual port being about three fourths of the width thereof, the downstream side wall of each port being disposed substantially tangential with respect to the inner wall surface of said cylinder, each port having its axis normal to said axis of said cylinder and having a vane located therein which extends from said inner wall surface of said cylinder substantially parallel to the side walls of the port, each vane in its associated port dividing the same into separate channels having substantially equal arcs at the junction of each port with said inner wall surface of said cylinder and extending upstream about one third the length of each port.

4. In a two-cycle reciprocating piston internal combustion engine wherein oxidizing gas is introduced into a cylinder of said engine so that said gas swirls rapidly around the cylindrical axis thereof and fuel is injected into a localized segment of the swirling gas disposed at one side of a diameter of said cylinder and ignited to provide a flame front which is confined in one direction by said oxidizing gas traveling toward said flame front and containing so little vaporized fuel that it is incombustible and in the opposite direction by products of combustion traveling away from said flame front, the improvement which comprises providing said cylinder with a plurality of ports having the same rotational sense and located uniformly on the circumference of its wall adjacent the bottom dead center position of the piston for introducing said oxidizing gas into said cylinder, the opposed walls of the individual ports being substantially parallel to each other with the downstream side wall of each port being disposed substantially tangential with respect to the inner wall surface of said cylinder, each port having a vane located therein which extends from said inner wall surface of said cylinder upstream no further than the perpendicular drawn to the side walls of each port from the point of intersection between the upstream side wall and said inner wall surface of said cylinder and substantially parallel with respect to said side walls of said port, dividing the same into separate channels having outlets of substantially equal arcs into said cylinder, the axis of each port being at a right angle to said cylindrical axis, and exhaust means for said cylinder located above the top dead center position of the piston, the width of each port being of the order of ½ the cylinder radius and the height of each port being about ¾ the width thereof.

References Cited in the file of this patent

UNITED STATES PATENTS

| | | |
|---|---|---|
| 2,169,652 | Ljungstrom | Aug. 15, 1939 |
| 2,244,453 | Fottinger et al. | June 3, 1941 |
| 2,349,305 | Pyk | May 23, 1944 |
| 2,484,009 | Barber | Oct. 11, 1949 |

FOREIGN PATENTS

| | | |
|---|---|---|
| 11,239 | Great Britain | May 31, 1901 |
| 96,732 | Austria | Apr. 25, 1924 |
| 601,463 | France | Nov. 30, 1925 |
| 710,975 | France | Sept. 1, 1931 |
| 712,862 | France | Oct. 14, 1931 |
| 981,801 | France | Jan. 17, 1951 |
| 692,384 | Germany | June 19, 1940 |